United States Patent
Saur et al.

(10) Patent No.: US 9,193,045 B2
(45) Date of Patent: Nov. 24, 2015

(54) TOOL ATTACHMENT

(71) Applicant: Robert Bosch GmbH

(72) Inventors: Dietmar Saur, Gomaringen (DE); Michael-Andreas Grunwald, Stuttgart-Rohr (DE)

(73) Assignee: ROBERT BOSCH GMBH, Stuttgart (DE)

( * ) Notice: Subject to any disclaimer, the term of this patent is extended or adjusted under 35 U.S.C. 154(b) by 276 days.

(21) Appl. No.: 13/644,896

(22) Filed: Oct. 4, 2012

(65) Prior Publication Data
US 2013/0093149 A1    Apr. 18, 2013

(30) Foreign Application Priority Data
Oct. 14, 2011    (DE) .......................... 10 2011 084 499

(51) Int. Cl.
*B23B 51/12*    (2006.01)
*B23B 31/113*    (2006.01)
*B25B 21/00*    (2006.01)

(52) U.S. Cl.
CPC .............. *B25B 21/00* (2013.01); *B23B 31/113* (2013.01); *B23B 51/12* (2013.01); *B25B 21/007* (2013.01); *Y10T 279/17683* (2015.01); *Y10T 279/32* (2015.01); *Y10T 279/3406* (2015.01); *Y10T 279/3412* (2015.01); *Y10T 408/957* (2015.01)

(58) Field of Classification Search
CPC .... B25B 21/00; B25B 21/007; B23B 31/113; B23B 51/12; Y10T 408/957; Y10T 279/17683; Y10T 279/32; Y10T 279/3412

USPC ........... 408/239 A; 279/89, 140, 144, 93, 143
See application file for complete search history.

(56) References Cited

U.S. PATENT DOCUMENTS

| | | | | |
|---|---|---|---|---|
| 1,494,859 A * | 5/1924 | Miller et al. | ..................... 279/93 |
| 3,396,981 A * | 8/1968 | Hammond | ..................... 279/89 |
| 3,484,114 A * | 12/1969 | Rodin | ........................... 279/144 |
| 4,573,839 A * | 3/1986 | Finnegan | .................. 408/239 R |
| 4,758,122 A * | 7/1988 | Kubo | ............................ 409/233 |
| 5,170,545 A * | 12/1992 | Hubscher | ..................... 29/26 A |
| 6,550,786 B2 * | 4/2003 | Gifford et al. | .................. 279/75 |
| 6,688,611 B2 * | 2/2004 | Gifford et al. | .................. 279/71 |
| 8,360,439 B2 * | 1/2013 | Hirt et al. | ....................... 279/143 |
| 8,920,081 B2 * | 12/2014 | Neumeier | .................... 409/232 |

* cited by examiner

*Primary Examiner* — Eric A Gates
*Assistant Examiner* — Chwen-Wei Su
(74) *Attorney, Agent, or Firm* — Kenyon & Kenyon LLP

(57) ABSTRACT

A tool attachment for mounting on a hand-held machine tool provided with a tool holder, the tool attachment having an output shaft and a base body at whose outer circumference a locking sleeve is disposed in a manner allowing it to rotate to release at least one assigned locking element; at the outer circumference of the base body, an anti-rotation unit is formed for the twist-proof mounting of the base body on a fastening unit assigned to the hand-held machine tool; on the anti-rotation unit and at an inner circumference of the fastening unit, complementary geometrical forms are provided which are configured to mesh with each other for the releasable, twist-proof mounting of the base body on the fastening unit.

11 Claims, 4 Drawing Sheets

TOOL ATTACHMENT

RELATED APPLICATION INFORMATION

The present application claims priority to and the benefit of German patent application no. 10 2011 084 499.6, which was filed in Germany on Oct. 14, 2011, the disclosure of which is incorporated herein by reference.

FIELD OF THE INVENTION

The present invention relates to a tool attachment for mounting on a hand-held machine tool provided with a tool holder, the tool attachment having an output shaft and a base body at whose outer circumference a locking sleeve is disposed in a manner allowing it to rotate in order to release at least one assigned locking element.

BACKGROUND INFORMATION

Tool attachments of this type are believed to be understood from the related art, whose base bodies can be locked in the area of a tool holder, provided on a corresponding hand-held machine tool, via locking elements that are operable with the aid of an assigned locking sleeve. For example, locking bars or projections are used as locking elements which, e.g., are disposed at the inner circumference of the locking sleeve and are aligned in the circumferential direction. They make it possible to mount the locking sleeve on the hand-held machine tool via what is termed a bayonet connection in which, after sliding the tool attachment onto the hand-held machine tool, the locking sleeve is rotated by a user from a release position into a locking position.

The disadvantage of the related art is believed to be that in each instance, the user needs both hands to lock such a tool attachment on a corresponding hand-held machine tool, one hand being necessary to slip the attachment on, and the other hand being needed to rotate the locking sleeve. This leads to a cumbersome and complicated manipulation of the tool attachments.

SUMMARY OF THE INVENTION

It is an object of this invention, therefore, to make a new tool attachment available that permits improved ease of use.

This problem is solved by a tool attachment for mounting on a hand-held machine tool provided with a tool holder, the tool attachment having an output shaft and a base body at whose outer circumference a locking sleeve is disposed in a manner allowing it to rotate in order to release at least one assigned locking element. At the outer circumference of the base body, an anti-rotation unit is formed for the twist-proof mounting of the base body on a fastening unit assigned to the hand-held machine tool. On the anti-rotation unit and at an inner circumference of the fastening unit, complementary geometrical forms are provided which are configured to mesh with each other for the releasable, twist-proof mounting of the base body on the fastening unit.

Thus, the exemplary embodiments and/or exemplary methods of the present invention are intended to provide a tool attachment that, owing to the complementary geometrical forms intended to mesh with each other, permits improved centering of the attachment on the hand-held machine tool, and thus simplified manageability.

According to one specific embodiment, the anti-rotation unit and the fastening unit are intended to form a positive-fit connection.

Thus, a robust and secure mounting of the tool attachment on the hand-held machine tool may be made possible.

The locking sleeve may be assigned a spring element having a predefined spring force which acts upon the locking sleeve in the direction of an assigned locking position in order to bring about the releasable, twist-proof mounting of the base body on the fastening unit, the locking position corresponding to a first rotational position of the locking sleeve.

This is intended to provide a stable and reliable locking system.

According to one specific embodiment, in the context of sliding the base body in a predefined axial direction onto the fastening unit of the hand-held machine tool, the locking sleeve is configured—owing to a deflection of the at least one assigned locking element at at least one guide edge of an at least one control element assigned to the fastening unit—to execute a rotational movement against the spring force of the spring element, from the assigned locking position into an assigned release position, the release position corresponding to a second rotational position of the locking sleeve.

Thus, the exemplary embodiments and/or exemplary methods of the present invention are intended to allow the provision of a self-locking locking system where, by the use of the at least one control element, when sliding and retaining the base body on the fastening unit, it is possible, in an easy manner, to dispense with a manipulation of the locking sleeve by the user.

Thus, when sliding the base body in the predefined axial direction onto the fastening unit of the hand-held machine tool, upon reaching an assigned axial end position, the locking sleeve may be configured, owing to the spring force of the spring element, to execute a rotational movement from the assigned release position into the assigned locking position, in order to allow the at least one assigned locking element to engage behind the at least one control element.

Consequently, a secure and reliable automatic locking of the tool attachment on the hand-held machine tool may be achieved in an easy manner.

The releasable, twist-proof mounting of the base body on the fastening unit of the hand-held machine tool may be releasable by a rotation of the locking sleeve in a direction of rotation directed against the spring force of the spring element, from the assigned locking position into the assigned release position.

Thus, the tool attachment may be released and removed from the hand-held machine tool in a quick and uncomplicated manner.

According to one specific embodiment, the anti-rotation unit has at least one groove-like cutout for receiving a bar-like elevation assigned to the fastening unit and/or has at least one bar-like elevation for engaging in a groove-like cutout assigned to the fastening unit.

This permits a stable and reliable, twist-proof mounting of the base body on the fastening unit.

According to one specific embodiment, a drive unit is provided which is connected to the base body and which has an eccentric gear for driving the output shaft.

Thus, the exemplary embodiments and/or exemplary methods of the present invention is intended to provide for, in easy fashion, forming the tool attachment in the manner of an eccentric attachment to therefore allow its use in a multitude of different fields of application.

The problem indicated at the outset is also solved by a hand-held machine tool having a tool holder and a housing, on which a tool attachment having an output shaft and a base body is able to be mounted. At an outer circumference of the base body, a locking sleeve is disposed in a manner allowing it to rotate in order to release at least one assigned locking element. A fastening unit is provided for the twist-proof mounting of an anti-rotation unit provided at the outer circumference of the base body; at an inner circumference of the fastening unit and on the anti-rotation unit, complementary geometrical forms are provided which are configured to mesh with each other for the releasable, twist-proof mounting of the base body on the fastening unit.

Moreover, the problem indicated at the outset is also solved by a tool system having a hand-held machine tool and a tool attachment, the hand-held machine tool having a tool holder and a housing, on which a base body of the tool attachment provided with an output shaft is able to be mounted. At an outer circumference of the base body, a locking sleeve is disposed in a manner allowing it to rotate in order to release at least one assigned locking element. On the housing, a fastening unit is provided for the twist-proof mounting of an anti-rotation unit provided at the outer circumference of the base body. At an inner circumference of the fastening unit and on the anti-rotation unit, complementary geometrical forms are provided which are configured to mesh with each other for the releasable, twist-proof mounting of the base body on the fastening unit.

The exemplary embodiments and/or exemplary methods of the present invention are explained in greater detail in the following description on the basis of exemplary embodiments illustrated in the drawings.

DETAILED DESCRIPTION

Figure 1:
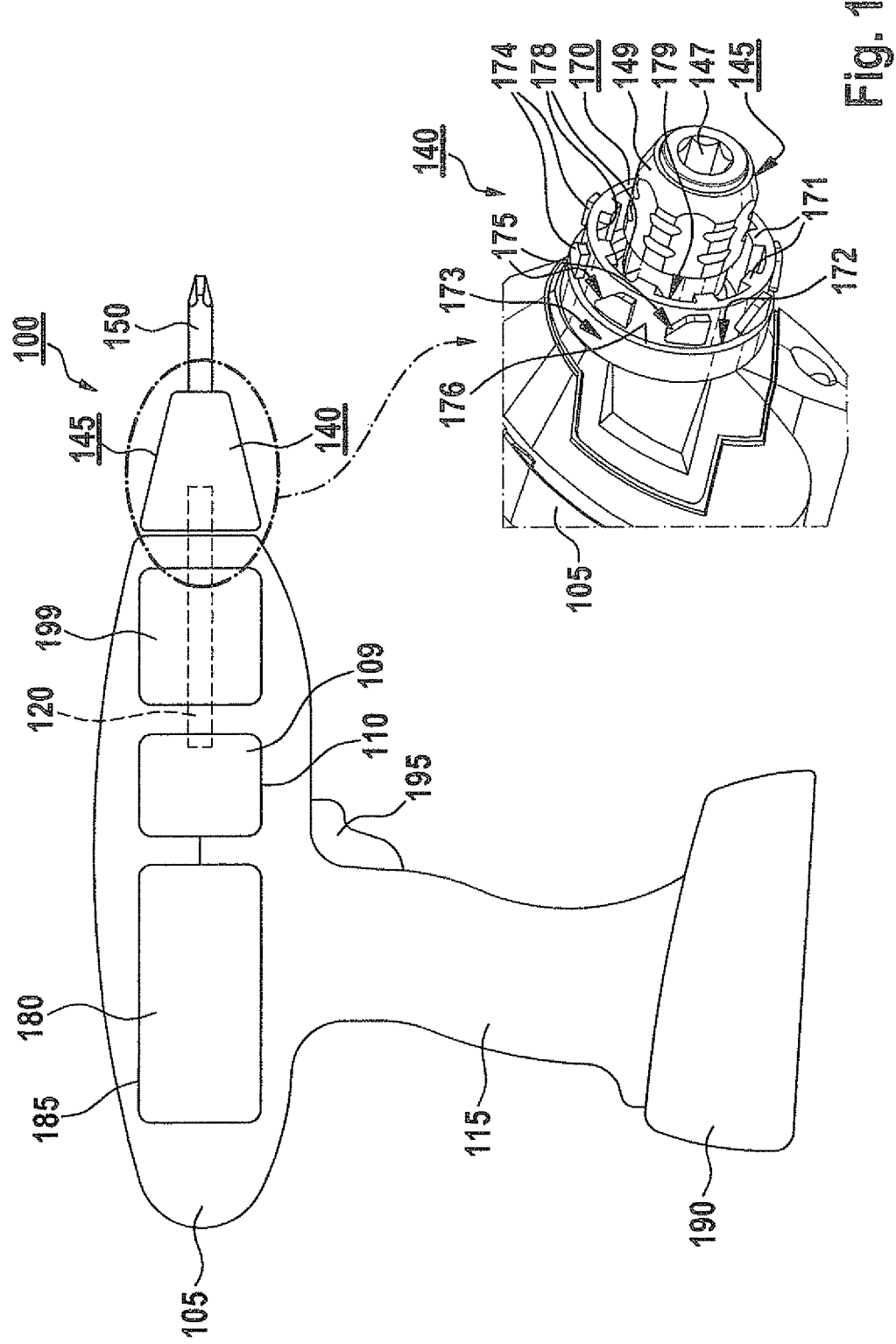
FIG. 1 shows a schematic view of a hand-held machine tool having a tool holder and a fastening unit according to one specific embodiment.

FIG. 1 shows an exemplary hand-held machine tool 100 which has a tool housing 105 having a grip 115. According to one specific embodiment, hand-held machine tool 100 is connectable mechanically and electrically to a battery pack 190 for the cordless power supply. By way of example, hand-held machine tool 100 in FIG. 1 is in the form of a cordless drill/driver. However, it is stressed that the exemplary embodiments and/or exemplary methods of the present invention are not limited to cordless drill/drivers, but rather may be used for various hand-held machine tools in which a tool is set in rotation, regardless of whether the hand-held machine tool is operable dependent on the power grid or cordlessly with battery pack 190, e.g., for a screwdriver or cordless screwdriver, an impact driver or cordless impact driver, an impact drill or a cordless impact drill, etc.

Disposed in tool housing 105 are an electric drive motor 180, supplied with current by battery pack 190, and a gear unit 109. Drive motor 180 is connected to a drive shaft 120, e.g., a drive spindle, via gear unit 109. During operation of hand-held machine tool 100, motor 180 drives drive shaft 120 via gear unit 109, causing the shaft to turn.

Drive motor 180 is situated illustratively in a motor housing 185 and gear unit 109 is in a gear housing 110, gear housing 110 and motor housing 185 being disposed, by way of example, in tool housing 105. Gear unit 109 is assigned a tool holder 140 for receiving a tool 150, the tool holder having a bit holder 145, by way of example. This tool holder 140 may be integrally molded on drive shaft 120 that is drivable by drive motor 180 via gear unit 109, or may be joined to it in the form of an attachment.

Illustratively, bit holder 145 has an actuating sleeve 149 and a hexagonal internal receiver 147 for receiving what is termed a HEX drill or a screwdriver bit. Suitable HEX drills and screwdriver bits are tools which have a shank having an at least sectionally hexagonal cross-section, that in the case of HEX drills, is provided with an annular groove. Moreover, bit holder 145 may also, or alternatively, be configured to receive what is called an SDS quick mini drilling tool. SDS quick mini drilling tools suitable for this are drilling tools which have an essentially cylindrical shank having two rotary entrainment bars that project parallel to the longitudinal axis of the shank and in each case have a locking cutout. Tools of this kind as well as the configuration and functioning method of a suitable bit holder are sufficiently familiar to one skilled in the art, e.g., from DE 20 2007 010 699 U1, whose disclosure is incorporated explicitly into the present specification, so that for the purpose of keeping the specification brief, it is possible to dispense with a detailed description of these components here.

Drive motor 180 is able to be turned on and off via a manual switch 195, for example, and may be any type of motor, e.g. an electronically commutated motor or a DC motor. Drive motor 180 may be electronically controllable or regulable in such a way that both a reversing duty as well as setpoint selections with respect to a desired rotational speed are able to be realized. The functioning method and the configuration of a suitable drive motor are known sufficiently from the related art, so that a detailed description is omitted here in order to keep the specification concise.

For example, gear unit 109 may take of the form of a type of reduction gear which is able to be realized, e.g., with a planetary gear that is configured with various planetary stages and to which, optionally, a torque clutch 199 is assigned. Torque clutch 199 is configured to prevent drive shaft 120 from being driven by gear unit 109 during operation of hand-held machine tool 100 if a torque transmitted from drive shaft 120 to gear unit 109 exceeds a threshold value able to be set by a user of hand-held machine tool 100. Moreover, hand-held machine tool 100 may have further components, e.g., a mechanical or pneumatic percussive tool, etc. However, it is stressed that a form of a suitable gear unit having an assigned torque clutch, as well as mechanical and pneumatic percussive tools and their methods of functioning are sufficiently familiar to one skilled in the art, so that for the purpose of keeping the specification brief and the drawing simple, an illustration and detailed description of them are omitted here.

According to one specific embodiment, hand-held machine tool 100, that is, tool holder 140 is assigned a fastening unit 170 which, illustratively, is secured to tool housing 105 in axially and radially immovable fashion. By way of example, it is sleeve-shaped, and therefore is also denoted hereinafter as "fastening sleeve." However, it should be pointed out that fastening sleeve 170 is formed as a separate component only by way of example, and alternatively, may also be formed in one piece with tool housing 105.

Fastening sleeve 170 is used as a locking and centering structure for an assigned tool attachment (200 in FIG. 2) and sheathes bit holder 145 at least sectionally with a predefined radial space, in order to permit an axial shift of actuating sleeve 149 of bit holder 145 in the interior of fastening sleeve 170. At inner circumference 179 of fastening sleeve 170, illustratively, bar-like elevations are provided that are set apart from each other, extend in the longitudinal direction of fastening sleeve 170 and are aligned radially inwards, and of which, for the purpose of clarity and distinctness of the drawing, only two elevations are denoted by reference numeral 171. Illustratively, between these bar-like elevations, groove-like cutouts are formed, of which, for the sake of clarity and distinctness of the drawing, only two cutouts are denoted by reference numeral 178. For example, these cutouts 178 may be formed as interspaces between the bar-like elevations, or in the manner of depressions at inner circumference 179 of fastening sleeve 170.

According to one specific embodiment, fastening sleeve 170 has an outer circumference 173 that tapers at an annular shoulder 172 into a reduced area 176 facing away from tool housing 105. In this reduced area 176, at least one or a plurality of plate-like control elements are provided at outer circumference 173. Illustratively, they are formed in the manner of right-angled trapezoids, and in each case have an assigned beveled guide edge. For the purpose of simplicity and clarity of the drawing, only two control elements are denoted by reference numeral 174, and only two guide edges are denoted by reference numeral 175.

Figure 2:
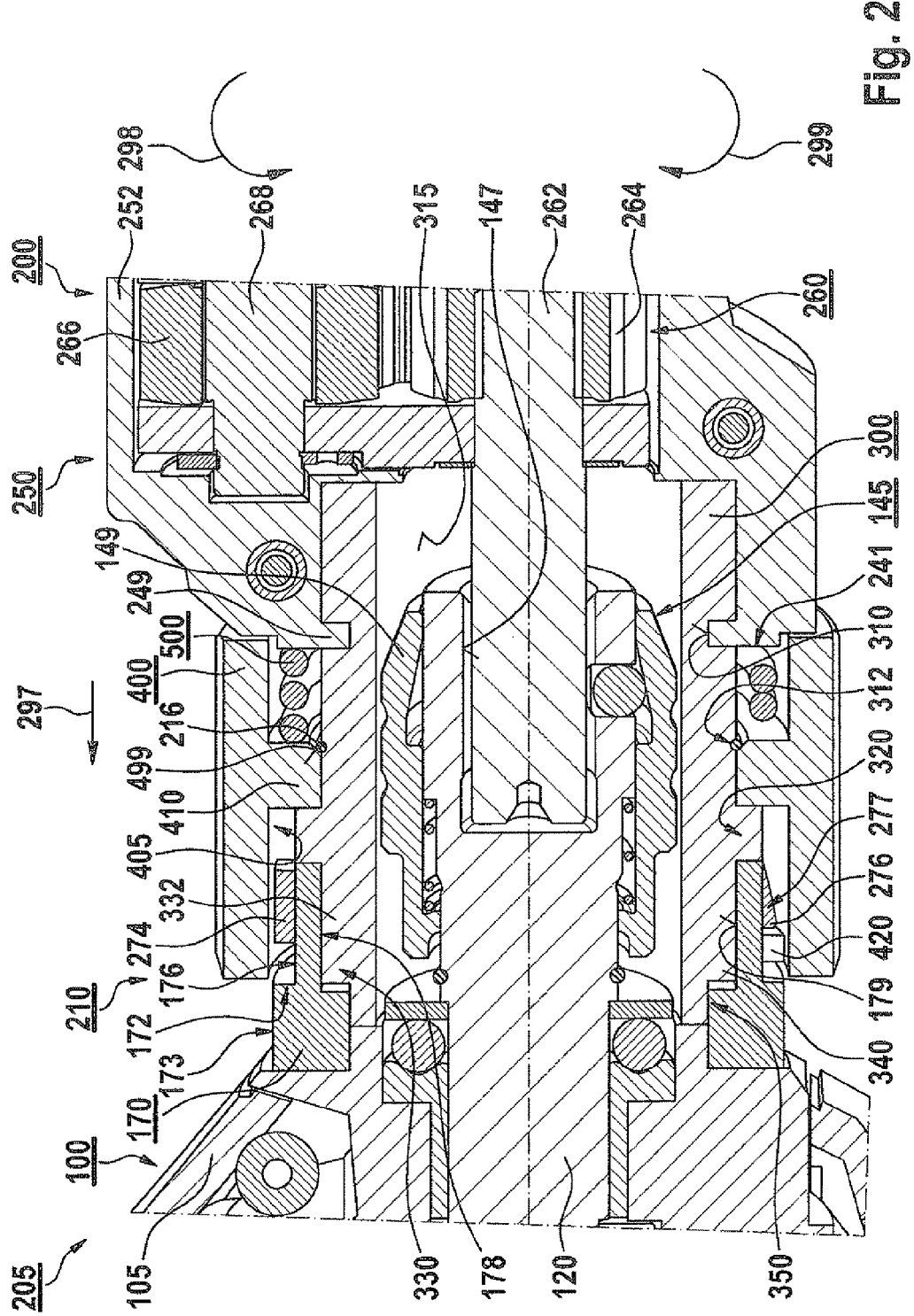
FIG. 2 shows a sectional view of a cut-away portion of a tool system having the hand-held machine tool from FIG. 1 and a tool attachment mounted on it according to one specific embodiment.

FIG. 2 shows a tool system 205 having hand-held machine tool 100 from FIG. 1 and an exemplary tool attachment 200 mounted on it. It is formed illustratively according to a type of eccentric attachment, and is provided for attaching to fastening sleeve 170 of hand-held machine tool 100. At its outer circumference 173, fastening sleeve 170 has two illustratively plate-like control elements 274, 276, control element 276 having a guide edge 277 by way of example. Control elements 274, 276 represent control elements 174 from FIG. 1.

According to one specific embodiment, tool attachment 200 has a locking section 210 provided for locking and centering, as well as a drive unit 250 also denoted hereinafter as "eccentric drive section." Illustratively, locking section 210 has a base body 300 that forms an inner hollow space 315 for receiving bit holder 145, and at its outer circumference 350, an anti-rotation unit 330 is formed on one hand, and on the other hand, a locking sleeve 400 is disposed in a manner that is rotationally movable and optionally not axially displaceable. Anti-rotation unit 330 is configured for the twist-proof mounting of base body 300 on fastening unit 170 of hand-held machine tool 100. Locking sleeve 400 is used for the release or locking of at least one assigned locking element 420 that, illustratively, is formed in the manner of a locking bar at inner circumference 405 of locking sleeve 400, the locking bar being aligned in the circumferential direction of locking sleeve 400.

According to one specific embodiment, in an axial end area of outer circumference 350 of base body 300 facing away from eccentric drive section 250, anti-rotation unit 330 is formed in such a way that anti-rotation unit 330 and fastening unit 170 of hand-held machine tool 100 have complementary geometrical forms which are suitable for forming a positive-fit connection, and to that end, are configured to engage with each other for the releasable, twist-proof mounting of base body 300 on fastening unit 170. Accordingly, as illustration, anti-rotation unit 330 has at least one bar-like elevation that extends at outer circumference 350 in the longitudinal direction of base body 300, two elevations 332, 340 being visible by way of example in FIG. 2. Between these bar-like elevations 332, 340, groove-like cutouts are formed, for example, as described below in connection with FIG. 3. For instance, they may be formed as interspaces between bar-like elevations 332, 340, or in the manner of depressions at outer circumference 350. Illustratively, bar-like elevations 332, 340 and the groove-like cutouts extend up to an annular projection 320, formed at outer circumference 350, against whose side facing eccentric drive section 250, an annular shoulder 410 abuts which is formed at inner circumference 405 of locking sleeve 400.

Annular shoulder 410 is disposed in at least essentially axially immovable fashion at outer circumference 350 of base body 300 between annular projection 320 and a retaining ring 216 situated illustratively in an annular groove 312 of base body 300. Exemplarily, annular shoulder 410 has a beveled edge 499 in the area of retaining ring 216.

In order to bring about the releasable, twist-proof mounting of base body 300 on fastening unit 170, illustratively, a spring element 500, e.g., a torsion spring, acts upon locking sleeve 400 with a predefined spring force in the direction of an arrow 298, forcing it into a locking position, the locking position corresponding to a first rotational position of locking sleeve 400. By way of example, torsion spring 500 is situated between annular shoulder 410 and an end face 241 of a housing section 252 assigned to eccentric drive section 250.

According to one specific embodiment, eccentric drive section 250 has an eccentric gear 260 having an output shaft 268, provided with a hexagonal internal receiver, for example, for driving a tool, e.g., tool 150 from FIG. 1. Illustratively, it is rotationally mounted in housing section 252 which, exemplarily, in the area of its end face 241, has a radially inwards directed annular collar 249 that is fixed in position in an assigned annular groove 310 provided at outer circumference 350 of base body 300, so that housing section 252 is secured to base body 300 in at least axially immovable fashion. Output shaft 268 is rotatable by a driven gear 266 that is able to be propelled by a driving gear 264 coupled to a drive shaft 262. Viewed in the axial direction, drive shaft 262 is rotationally mounted at least on one side on housing section 252 and may be connectable at least with an internal receiver of a bit holder, e.g., hexagonal internal receiver 147 of bit holder 145 from FIG. 1.

However, it should be pointed out that suitable eccentric drive sections and eccentric gears are sufficiently familiar to one skilled in the art. Therefore, to keep the specification succinct, a detailed description of these components is omitted here.

To mount tool attachment 200 on fastening sleeve 170 of hand-held machine tool 100, its base body 300 is slid in the direction of an arrow 297 onto fastening sleeve 170. In so doing, first of all, the axial end area of hollow space 315 facing fastening sleeve 170 is positioned and centered over fastening sleeve 170, and the axial end of drive shaft 262 facing internal receiver 147 of bit holder 145 from FIG. 1 is inserted into it. By sliding tool attachment 200 further in the direction of arrow 297, bar-like elevations 332, 340 of anti-rotation unit 330 then come into engagement with assigned groove-like cutouts 178 of fastening sleeve 170, and bar-like elevations (171 of FIG. 1) of fastening sleeve 170 engage with assigned groove-like cutouts (390 in FIG. 3) of anti-rotation unit 330. At the same time, illustratively, locking bar 420 comes in contact with guide edge 277 of control element 276. Analogous to that, further locking bars (e.g. 422, 424, 426 in FIG. 4) may come in contact with additional control elements (e.g., 174 of FIG. 1), that is, their guide edges (e.g., 175 in FIG. 1).

Further sliding of tool attachment 200 in the direction of arrow 297 then brings about a tangential shift of locking bar 420 along guide edge 277. In this context, by way of locking bar 420, an action of force is produced on locking sleeve 400 which leads to a rotational movement of locking sleeve 400 against the spring force of spring element 500 in the direction of an arrow 299, from the assigned locking position into an assigned release position that corresponds to a second assigned rotational position of locking sleeve 400.

The tangential shift of locking bar 420 ends when it, due to the sliding of tool attachment 200 in the direction of arrow 297, arrives at an axial end area of control element 276, and locking sleeve 400 has thus reached an axial end position on one hand and the release position on the other hand. There, locking sleeve 400 rotates in the direction of arrow 298 due to the spring force of torsion spring 500 which, as described above, acts upon locking sleeve 400, forcing it into its locking position, since such a rotation is no longer blocked by locking bar 420 abutting against guide edge 277. Meanwhile, locking bar 420 is moved, illustratively, into a free area formed between control element 276 and annular shoulder 172 provided at outer circumference 173 of fastening sleeve 170, and viewed in the axial direction of tool attachment 200, thus engages behind control element 276, so that an axial locking of locking sleeve 400 on fastening sleeve 170 is thereby achieved.

Accordingly, base body 300 and thus tool attachment 200 are releasably retained on fastening unit 170 of hand-held machine tool 100 without it being necessary for a user to manually rotate locking sleeve 400 for that purpose. Thus, the user is able to mount tool attachment 200 on hand-held machine tool 100 in a convenient manner using one hand. In doing so, base body 300 to support the torque is fixed in position and centered in twist-proof manner on fastening unit 170 with the aid of anti-rotation unit 330.

According to one specific embodiment, the releasable, twist-proof mounting of base body 300 on fastening unit 170 is releasable by releasing locking sleeve 400, which may be achieved by a manual rotation of locking sleeve 400 in the direction of arrow 299 against the spring force of torsion spring 200, from the locking position into a corresponding release position. In so doing, the engagement of control element 276 from behind by locking bar 420 is released, so that an axial shift of tool attachment 200 counter to direction 297 is able to take place in order to loosen and remove tool attachment 200 from hand-held machine tool 100.

Figure 3:
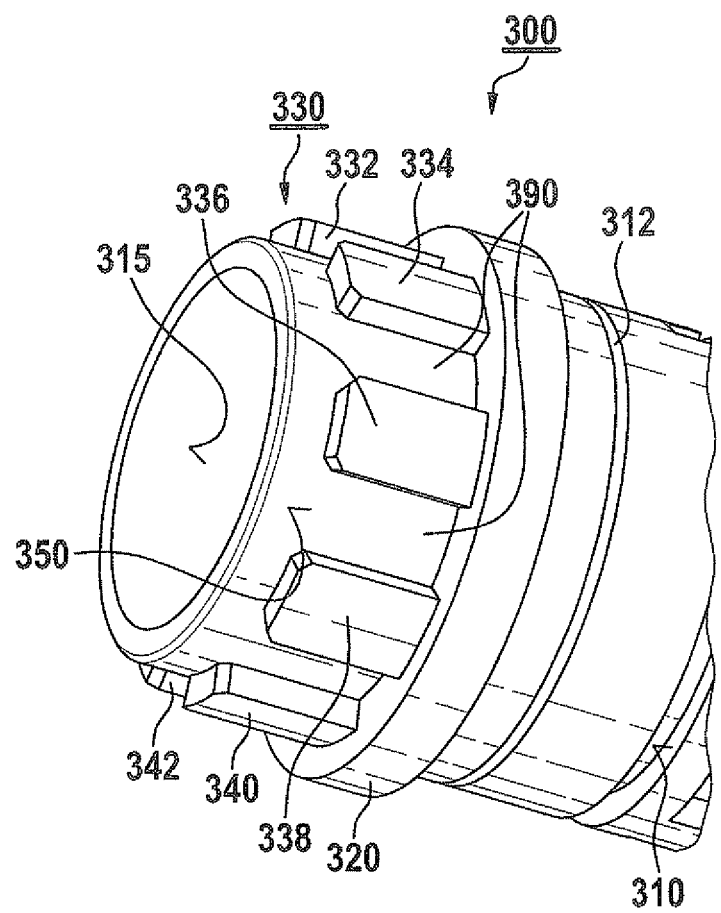
FIG. 3 shows a perspective view of the base body of the tool attachment from FIG. 2.

FIG. 3 shows base body 300 of tool attachment 200 from FIG. 2 together with anti-rotation unit 330 for the purpose of illustrating annular grooves 310, 312 formed at its outer circumference 350, annular projection 320 as well as bar-like elevations 332, 340 from FIG. 2. Moreover, at outer circumference 350 in the area of anti-rotation unit 330, illustratively, further bar-like elevations 334, 336, 338, 342 are shown, as well as groove-like cutouts that, by way of example, are formed between elevations 332, 334, 336, 338, 340, 342, but alternatively, may also be formed as depressions at outer circumference 350. For the purpose of keeping the drawing clear and simple, only two groove-like cutouts are denoted by reference numeral 390.

Figure 4:
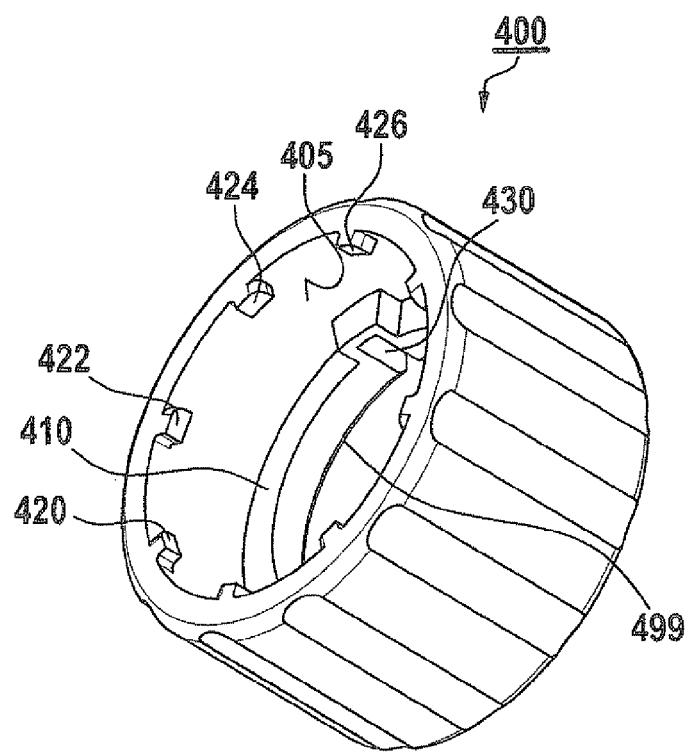
FIG. 4 shows a perspective view of the locking sleeve of the tool attachment from FIG. 2.

FIG. 4 shows locking sleeve 400 of tool attachment 200 from FIG. 2 having annular shoulder 410, formed at its inner circumference 405, on which beveled edge 499 is provided, as well as locking bar 420. Moreover, as illustration, further locking bars are shown at inner circumference 405, of which only three are denoted by reference numerals 422, 424, 426 in order to keep the drawing clear and simple.

Furthermore, according to one specific embodiment, in the area of annular shoulder 410, a groove-like receiver 430 is provided. It is used, for example, to receive an end area (510 in FIG. 5) of torsion spring 500 from FIG. 5, to thus permit the spring to act upon locking sleeve 400 as described in connection with FIG. 2.

Figure 5:
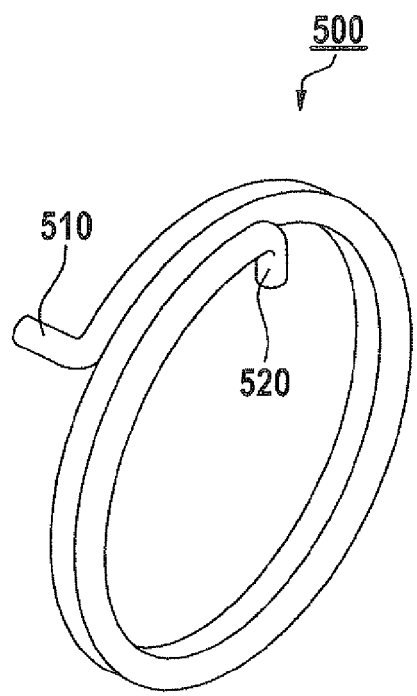
FIG. 5 shows a perspective view of the spring element of the tool attachment from FIG. 2.

FIG. 5 shows torsion spring 500 of tool attachment 200 from FIG. 2 having a first angled end area 510 that is provided, for example, to engage in groove-like receiver 430 of locking sleeve 400 from FIG. 4, as well as a second angled end area 520. It is used, for instance, to secure torsion spring 500 on base body 300 from FIG. 2 or 3.

What is claimed is:

1. A tool attachment for mounting on a hand-held machine tool, provided with a tool holder, comprising:
    an output shaft;
    a base body, wherein a locking sleeve is disposed at an outer circumference of the base body, so as to allow it to rotate to release at least one assigned locking element; and
    an anti-rotation unit, formed at the outer circumference of the base body, for providing a twist-proof mounting of the base body on a fastening unit assigned to the hand-held machine tool, wherein there are complementary geometrical forms on the outer circumference of the anti-rotation unit and at an inner circumference of the fastening unit, and wherein the forms are configured to mesh with each other for the releasable, twist-proof mounting of the base body on the fastening unit,
    wherein the anti-rotation unit has at least one bar-like elevation which extends at the outer circumference in a longitudinal direction of the base body for engaging in at least one groove-like cutout assigned to the inner circumference of the fastening unit,
    wherein the locking sleeve is assigned a spring element having a predefined spring force which acts upon the locking sleeve in a direction of an assigned locking position so as to bring about the releasable, twist-proof mounting of the base body on the fastening unit, and wherein the locking position corresponds to a first rotational position of the locking sleeve.

2. The tool attachment of claim 1, wherein the anti-rotation unit and the fastening unit form a positive-fit connection.

3. The tool attachment of claim 1, wherein in the context of sliding the base body in a predefined axial direction onto the fastening unit of the hand-held machine tool, the locking sleeve is configured, owing to a deflection of the at least one assigned locking element at at least one guide edge of an at least one control element assigned to the fastening unit, to execute a rotational movement against the spring force of the spring element, from the assigned locking position into an assigned release position, the release position corresponding to a second rotational position of the locking sleeve.

4. The tool attachment of claim 3, wherein in the context of sliding the base body in the predefined axial direction onto the fastening unit of the hand-held machine tool, upon reaching an assigned axial end position, the locking sleeve is configured, owing to the spring force of the spring element, to execute a rotational movement from the assigned release position into the assigned locking position, so as to allow the at least one assigned locking element to engage behind the at least one control element.

5. The tool attachment of claim 1, wherein the releasable, twist-proof mounting of the base body on the fastening unit of the hand-held machine tool is releasable by a rotation of the locking sleeve in a direction of rotation directed against the spring force of the spring element, from the assigned locking position into the assigned release position.

6. The tool attachment of claim 1, wherein the at least one groove-like cutout is configured for receiving the bar-like elevation.

7. The tool attachment of claim 1, wherein the at least one locking element is arranged on an inner circumference of the locking sleeve, and configured to engage behind at least one corresponding control element assigned to an outer circumference of the fastening unit.

8. A tool attachment for mounting on a hand-held machine tool, provided with a tool holder, comprising:
an output shaft;
a base body, wherein a locking sleeve is disposed at an outer circumference of the base body, so as to allow it to rotate to release at least one assigned locking element; and
an anti-rotation unit, formed at the outer circumference of the base body, for providing a twist-proof mounting of the base body on a fastening unit assigned to the hand-held machine tool, wherein there are complementary geometrical forms on the outer circumference of the anti-rotation unit and at an inner circumference of the fastening unit, and wherein the forms are configured to mesh with each other for the releasable, twist-proof mounting of the base body on the fastening unit,
wherein the anti-rotation unit has at least one bar-like elevation which extends at the outer circumference in a longitudinal direction of the base body for engaging in at least one groove-like cutout assigned to the inner circumference of the fastening unit,
wherein a drive unit is connected to the base body and has an eccentric gear for driving the output shaft.

9. A hand-held machine tool, comprising:
a tool holder;
a housing, on which a tool attachment having an output shaft and a base body is mountable, a locking sleeve being disposed in a manner allowing it to rotate so as to release at least one assigned locking element being provided at an outer circumference of the base body; and
a fastening unit for providing a twist-proof mounting of an anti-rotation unit provided at the outer circumference of the base body, wherein complementary geometrical forms are provided at an inner circumference of the fastening unit and on the outer circumference of the anti-rotation unit, and wherein the forms are configured to mesh with each other for the releasable, twist-proof mounting of the base body on the fastening unit,
wherein the anti-rotation unit has at least one bar-like elevation which extends at the outer circumference in a longitudinal direction of the base body for engaging in at least one groove-like cutout assigned to the inner circumference of the fastening unit,
wherein the locking sleeve is assigned a spring element having a predefined spring force which acts upon the locking sleeve in a direction of an assigned locking position so as to bring about the releasable, twist-proof mounting of the base body on the fastening unit, and wherein the locking position corresponds to a first rotational position of the locking sleeve.

10. The hand-held machine tool of claim 9, wherein the fastening unit further comprises at least one control element arranged on an outer circumference of the fastening unit, and configured to be engaged behind by the at least one assigned locking element assigned to an inner circumference of the locking sleeve.

11. A tool system, comprising:
a hand-held machine tool; and
a tool attachment;
wherein the hand-held machine tool includes a tool holder and a housing, on which a base body of the tool attachment is provided with an output shaft is mountable, wherein a locking sleeve is disposed so as to allow it to rotate so as to release at least one assigned locking element provided at an outer circumference of the base body, wherein a fastening unit for providing a twist-proof mounting of an anti-rotation unit is provided at the outer circumference of the base body is provided on the housing, complementary geometrical forms being provided at an inner circumference of the fastening unit and on the outer circumference of the anti-rotation unit, and wherein the forms are configured to mesh with each other for the releasable, twist-proof mounting of the base body on the fastening unit,
wherein the anti-rotation unit has at least one bar-like elevation which extends at the outer circumference in a longitudinal direction of the base body for engaging in at least one groove-like cutout assigned to the inner circumference of the fastening unit,
wherein the locking sleeve is assigned a spring element having a predefined spring force which acts upon the locking sleeve in a direction of an assigned locking position so as to bring about the releasable, twist-proof mounting of the base body on the fastening unit, and wherein the locking position corresponds to a first rotational position of the locking sleeve.

* * * * *